United States Patent [19]

Hu et al.

[11] Patent Number: 5,508,859
[45] Date of Patent: Apr. 16, 1996

[54] GRAVITY FEED DATA STORAGE LIBRARY HAVING MAGNETIC PICKER

[75] Inventors: Paul Y. Hu; Donald W. Lloyd; James C. Simkins, all of Tucson, Ariz.

[73] Assignee: International Business Machines Corporation, Armonk, N.Y.

[21] Appl. No.: 372,726

[22] Filed: Jan. 17, 1995

Related U.S. Application Data

[63] Continuation of Ser. No. 46,829, Apr. 14, 1993, abandoned.

[51] Int. Cl.$^6$ .......................... G11B 15/68; G11B 17/22; G11B 17/04
[52] U.S. Cl. ............... 360/92; 369/36; 369/178; 414/276; 414/932; 901/40
[58] Field of Search ............... 369/34, 36, 37, 369/38, 39, 178, 191–194; 360/92; 414/273, 276, 281, 737, 606, 932; 901/40; 294/65.5; 206/387, 444

[56] References Cited

U.S. PATENT DOCUMENTS

| | | | |
|---|---|---|---|
| 574,531 | 1/1897 | Fergusion | 221/289 |
| 3,750,804 | 8/1973 | Lemelson | 214/16.4 |
| 3,753,507 | 8/1973 | James et al. | 214/16.4 |
| 3,795,334 | 3/1974 | Ishida et al. | 414/737 X |
| 4,175,674 | 11/1979 | Johnson et al. | 221/88 |
| 4,212,381 | 7/1980 | Cook | 193/40 |
| 4,251,177 | 2/1981 | Neuhaeusser | 414/276 |
| 4,681,504 | 7/1987 | Welch | 414/268 |
| 4,802,035 | 1/1989 | Ohtsuka | 360/92 |
| 4,867,628 | 9/1989 | Ammon et al. | 414/273 |
| 4,989,191 | 1/1991 | Kuo | 369/33 |
| 5,015,139 | 5/1991 | Baur | 414/281 |
| 5,132,789 | 7/1992 | Ammon et al. | 358/86 |

FOREIGN PATENT DOCUMENTS

| | | | |
|---|---|---|---|
| 2551884 | 11/1975 | Germany. | |
| 4100234 | 7/1992 | Germany. | |
| 1-158667 | 6/1989 | Japan | 206/444 |
| 2-9053 | 1/1990 | Japan | 360/92 |
| 576903 | 6/1976 | Switzerland. | |
| 0628038 | 10/1978 | U.S.S.R.. | |
| 8605292 | 9/1986 | WIPO. | |
| 9005362 | 5/1990 | WIPO. | |

OTHER PUBLICATIONS

IBM TDB, vol. 27, No. 1B, Jun. 1984, pp. 473–474 "Automatic Feed Cartridge Pick–Up Mechanism".
IBM TDB, vol. 27, No. 2, Jul. 1984, pp. 1033–1034 "Cartridge Library System Position Sensing".

Primary Examiner—Stuart S. Levy
Assistant Examiner—William J. Klimowicz
Attorney, Agent, or Firm—Manny W. Schecter

[57] ABSTRACT

An automated storage library having the ability to store and manipulate data storage elements in three dimensions. Data storage elements such as tape cartridges are stored in storage compartments separated by low-friction downward sloping sliding planes each capable of holding a plurality of data storage elements. The automated storage library further includes a magnetic picker apparatus having two electromagnetic coils. In one embodiment, the two coils are energized simultaneously with the first coil used to reposition an L-shaped flipper. This flipper raises a roller gate positioned at one end of a storage compartment to release a stored data storage element. The second electromagnetic coil supplements the gravitational pull on the data storage element by attracting a steel strip on the face of the data storage element and an associated coil carriage retrieves the data storage element from the compartment.

20 Claims, 7 Drawing Sheets

GRAVITY FEED DATA STORAGE LIBRARY HAVING MAGNETIC PICKER

This application is a continuation of application Ser. No. 08/046,829, filed Apr. 14, 1993, now abandoned.

BACKGROUND OF THE INVENTION

1. Field of the Invention

This invention relates to automated storage libraries. More particularly, this invention relates to a magnetic picker mechanism for a gravity feed storage library.

2. Description of the Prior Art

Many business and technical applications require very large databases for storing information used in connection with the applications. Database storage requirements can exceed hundreds or thousands of gigabytes of data. Often these storage requirements can not be met by disk drive storage due to cost and/or physical space limitations. Data storage for such large databases are typically stored on magnetic tape which provides the lowest storage cost per unit of data.

Tape storage, however, generally requires the longest access time among existing technologies for retrieving the stored data. There are two primary reasons for this. First, once a tape is loaded into a tape drive, accessing the data stored on the tape is substantially slower than accessing data stored on devices such as a direct access storage device (DASD) or an optical disk. This is primarily due to the respective transport speeds of the data containing medium as well as the bandwidth attainable by the read heads present in the respective storage devices. Moreover, since tape is accessed sequentially, a substantial delay can occur prior to locating the required tape segment. Secondly, the time required to locate the desired tape and transport it to the tape drive for loading can bring about substantial delays.

Early magnetic tape databases required an operator, when prompted, to retrieve a tape from a shelf and load the tape into a tape drive. This procedure was not only time consuming but was also prone to human operator errors. Automated storage libraries such as that disclosed in U.S. Pat. No. 5,015,139 have been developed to overcome the delays associated with loading and unloading tapes. In addition, automated storage libraries eliminate the above described human operator errors associated with handling the tapes.

It is now possible, through the use of automated storage libraries, to automatically retrieve a data storage element (e.g. a tape cassette) from a storage location, transport it to a drive unit associated with the computer system and insert it therein. In this manner, human operator error can be avoided and request to load time can be significantly decreased.

The ability to place larger amounts of data on tape has derived principally from two technological advancements. First, actual cartridge size has been diminished as a result of various mechanical advances. Secondly, media properties and associated high density MR recording heads have been improved and developed to store more data on a given area of tape. Data can currently be written to 36 tracks or more. It can be thus be seen that with the improvements in physical size, thin film magnetic head and media technologies that have taken place over the years, it has become possible to pack more and more data into a smaller and smaller storage element such a tape cartridge. These advances in magnetic tape and head technology have made automated tape libraries more appealing in recent years.

Access time and reliability is improved in an automated tape library by automatically managing the storage and retrieval of tape cartridges. Operational benefits of using an automated tape library include greater reliability in tape cartridge mounts, better predictability in request-to-mount time and improved off-shift availability. Automated tape libraries include a large number of storage slots for storing library resident tape cartridges as well as one or more tape drives connected to the data processing system. They also include a picker mechanism which operates on command from the processing system to transfer a tape cartridge between a storage slot and a tape drive within seconds. In some cases it may also move a cartridge from one storage slot to another.

The robotic picker typically includes a mechanical gripper for retrieving the tapes and a system for locating the proper tape to retrieve or store. The tape may be located via a vision system residing on the picker mechanism. This vision system can view fidicial marks or a bar code attached to a tape cartridge in order to identify the correct cartridge to be picked. The vision system may also provide feedback to the gripper system so that the gripper system can move to the correct position in order to pick the designated tape cartridge.

It will be understood by one of ordinary skill in the art that such a picker can be configured to access and transport a variety of data elements, tape cartridges and optical disk cartridges being only two such elements. As such, it will be realized that the novel aspects of this invention can be applied in any sort of automated storage library, the automated tape library being only one possible application.

While the above-described automated storage libraries provide many advantages, they also suffer from drawbacks which can limit their potential application. This is especially true as databases get larger and computer floor space is at a premium. The library systems of the prior art typically only store cartridges in two dimensional arrays. In the case of a linear library such as the IBM 3495 Tape Library Dataserver, it is the height and length of the library and in the case of a circular library such as the 4400 Automated Cartridge System manufactured by the Storage Technology Corp., it is the circumference and the height.

The space aspect ratio for a linear library resulting from a two dimensional array could be as high as 18 to 1. In other words, the length of the library can be up to 18 times that of its width in order to hold the number of data cartridges required for the application. With space aspect ratios this high, much of an installation's usable floor space can easily be taken up by tape cartridge storage. Moreover, some users simply can not tolerate the spatial demands imposed by tape libraries in the prior art configuration.

The size of the picker mechanism can also be a limiting factor. Mechanically operated picker mechanisms can be large and complex. This is due to the requirement for servo mechanisms and the mechanical controls which are not required with a magnetic picker mechanism.

It is also important that the cartridge cells in the library be spaced sufficiently apart to allow the picker assembly to grab the cartridge without interference from other cartridges or portions of the cell enclosure. This, as a result, reduces cartridge packing density in the automated storage library and requires a larger storage area to contain the same amount of data.

There are various other constraints on the design of the cartridge storage area. For example, the cartridge in a library storage cell often must be tilted backwards to prevent it from falling out during environmental events such as earthquakes. In some cases, the possibility and severity potential of earthquake excitation is so high that an additional locking mechanism must be employed to prevent tape cartridges from falling out of their storage locations.

It should be noted that although the theoretical maximum storage density limit for IBM 3490 form factor cartridges (using a very narrow picker mechanism) is about 165 cartridges/sq. ft., the current state of the art maximum storage density for the same cartridge type in an automated storage library is about 59 cartridges/sq. ft. It can thus be seen that, with proper design and innovation, cartridge densities closer to the theoretical limit can be achieved.

SUMMARY OF THE INVENTION

Accordingly, it is an object of the present invention to provide an improved method and apparatus for storing and retrieving large amounts of data.

It is a further object of this invention to provide an automated storage library which includes a reliable and compact magnetic picker mechanism for accessing a selected data element and loading it into a drive.

It is a yet further object of this invention to provide an automated storage library capable of storing large amounts of data in a minimal physical space.

It is a still further object of this invention to provide an automated storage library which maintains data elements within their storage compartments even under such environmental events as earthquakes.

According to the invention, these objects are accomplished by an automated storage library having the ability to store and manipulate data storage elements in three dimensions. Tape cartridges are stored in storage compartments separated by low-friction downward sloping sliding planes each capable of holding a plurality of data storage elements. The automated storage library further includes a magnetic picker apparatus having two electromagnetic coils. In one embodiment, the two coils are energized simultaneously with the first coil used to reposition an L-shaped flipper. This flipper raises a roller gate positioned at one end of a storage compartment to release a stored data storage element through the force of gravity. The second electromagnetic coil supplements the gravitational pull on the data storage element by attracting a steel strip on the face of the data storage element and an associated coil carriage retrieves the data storage element from the compartment.

BRIEF DESCRIPTION OF THE DRAWINGS

The above and further objects, features and advantages of the present invention will become more apparent from the following detailed description taken in conjunction with the accompanying drawings, wherein.

DESCRIPTION OF THE PREFERRED EMBODIMENT OF THE INVENTION

Figure 1:
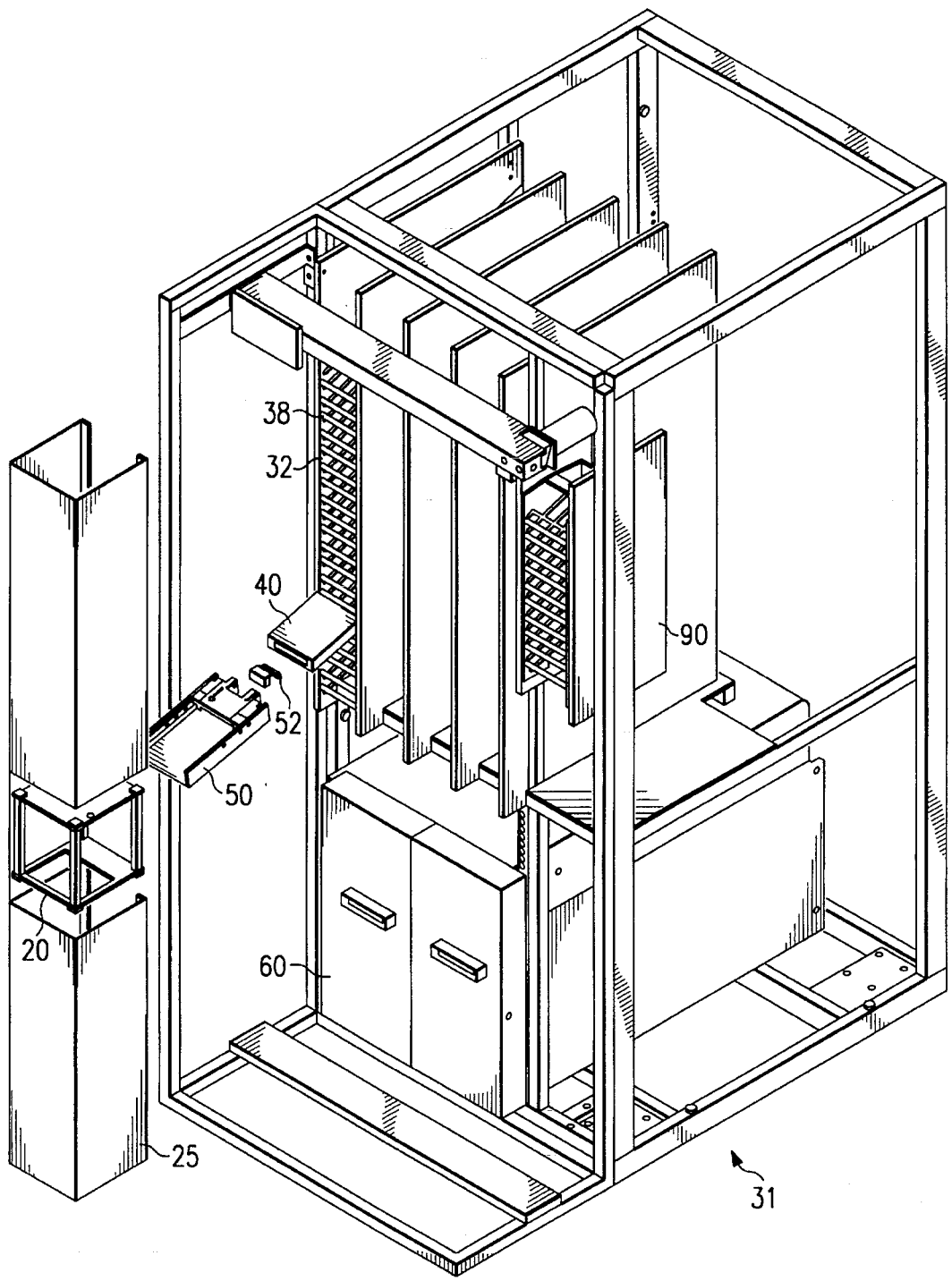
FIG. 1 is a perspective view of the automated tape library of the present invention having portions of its cover removed and explosions of its various parts.

In the drawings accompanying this description, like numerals indicate like parts and structural features in the various figures. Referring now to FIG. 1, the automated tape library is shown in perspective view. The automated tape library 31 is able to manage a very large database by storing data on a large number of magnetic tapes. Each magnetic tape is housed in a plastic cartridge 40 for protecting the magnetic tape and providing a convenient handling mechanism for a robotic picker. The automated tape library 31 includes a plurality of storage compartments 32 each capable of holding one or more tape cartridges 40. In the event of multiple cartridges 40 being stored within one compartment 32, the cartridges 40 all face forward and are in contact with each other through the force of gravity.

The automated tape library 31 of the current invention employs storage compartments 32 with downward sloping low friction sliding planes. The individual compartments 32 are slightly larger than the size of the cartridges 40 held therein. In the depth dimension, the compartments 32 are preferably sized to hold a plural number of cartridges 40. In the preferred embodiment of this invention the sloping angle of the compartments 32 is about 18 degrees. It is desirable to have a low friction sliding plane as part of the compartments 32 so that the cartridges 40 easily slide out under the force of gravity.

It has been determined through experimentation that 18 degrees is the preferable slope for the sliding plane based upon two competing factors. At a very high degree of slope, storage efficiency is lost. In other words, less cartridges v can be stored in a unit area at higher slopes. On the other hand, if the slope is too low the gravitational pull on the cartridges may not be sufficient to consistently promote their release upon raising of the roller gate 38. The inventors herein have determined that a slope of 18 degrees provides the best tradeoff between the need for gravitational pull and the desire for increased cartridge capacity.

While gravity alone is often sufficient to unload a cartridge 40 from a compartment 32, the preferred embodiment of this invention also employs an electromagnetic coil for this purpose. The operation of this coil and the apparatus associated with it will be described in detail below.

In the preferred embodiment of this invention it is possible to hold up to 240 cartridges 40. This is accomplished by providing 4 individual columns each having 15 rows of compartments 32. Each compartment 32 is sized to fit up to four cartridges 40. Since each compartment 32 can hold up to four cartridges, a total of 240 tapes may be accommodated. Thus, each compartment 32 in the preferred embodiment contains 4 cartridges.

It should be noted, however, that depending upon the algorithm employed to transfer cartridges 40, it may be necessary to leave one or two compartments 32 open to provide for temporary storage during transfers. The extra storage compartments 32 might be required to house one or more cartridges 40 when a cartridge 40 residing at the back of a compartment 32 is requested. In this case the cartridges 40 located at the front of the compartment 32 will be relocated to a compartment 32 having at least one empty slot.

The sliding plane is preferably made of a fluorocarbon sealed hardcoat anodized aluminum, however other low friction sliding materials such as "DELRIN" or "TEFLON" (Trademarks of the Dupont Corporation) coatings on top of metal or plastic can also be used with satisfactory results. The cartridges 40 are kept from sliding out of the compartments 32 by roller gates 38 residing at the front edge of the compartments 32. The mechanism which holds the cartridges 40 in place when desired but also allows retrieval by the picker mechanism is an important aspect of this invention and will be discussed in detail below.

Another important aspect of this invention is the ability to store a large amount of data cartridges within a small area. This is accomplished by adding a third dimension (depth) to the compartment layout. While the preferred embodiment has a cartridge depth of four, the storage compartments 32 can have a depth of any reasonable number of cartridges. The invention is also applicable to a compartment layout storing only a single data cartridge 40.

The automated tape library 31 of the current invention also includes at least one tape drive unit 60. The tape drive unit 60, as is well known in the art, reads and writes data from the cartridges 40 and further provides a communication path to the host computer system (not shown). There is also included an input/output station 90 which provides the capability for an operator to insert and remove cartridges 40 to and from the tape library 31. The automated tape library 31 of this invention receives all control information from an attached processor which could be a dedicated personal computer or specific control logic within the host processor itself. The attached processor maintains an inventory of cartridges 40 currently located within the automated tape library 31.

An elevator 20 containing a carriage sleeve 50 is further included in the automated tape library 31 of this invention. The elevator 20 raises and lowers the carriage sleeve 50 within the elevator tube 25 in order to transfer cartridges 40 between various storage compartments 32 as well as to the tape drives 60. The details of this operation are further discussed below.

Figure 2:
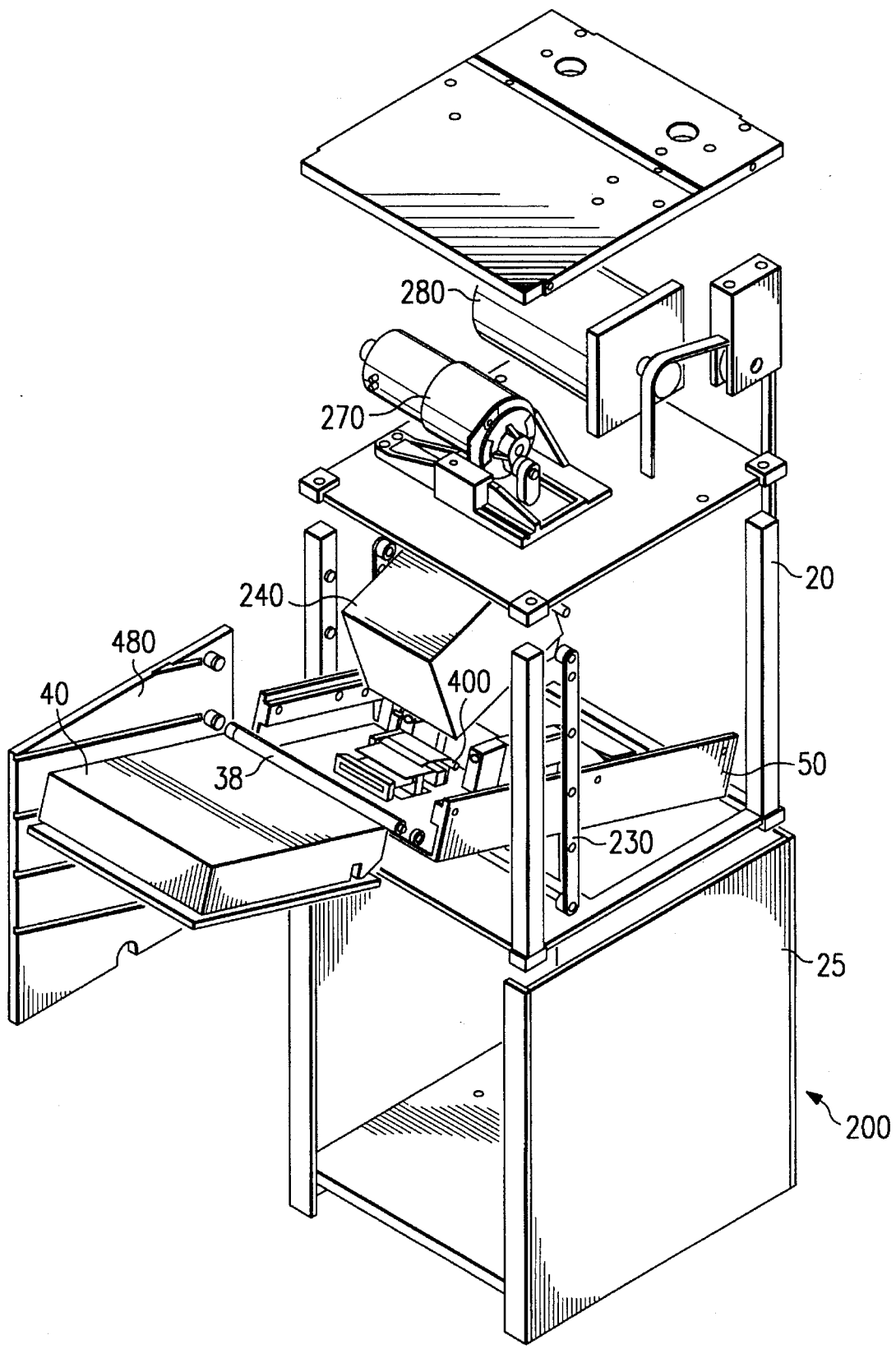
FIG. 2 is a detailed view of the elevator assembly and a single storage compartment included and shown in the automated tape library of FIG. 1.

Turning now to FIG. 2, the elevator assembly and the compartment structure are shown and discussed in greater detail.

The elevator assembly 200 includes picker assembly 400 which is located within carriage sleeve 50. Picker assembly 400 is motorized and rides on gear racks attached to the inside walls of carriage sleeve 50. Carriage sleeve 50 is attached to picker tilt linkage 230 at both sides. Picker tilt linkage 230 is integrally connected to picker tilt motor 270 to allow for varying inclination angles of the incline planes within the storage compartments 32. This is also important when tape cartridges 40 are loaded into tape drives 60 since tape drive load doors are typically parallel with the floor plane (i.e. not inclined). In this case the picker tilt motor 270 is activated to transmit, via picker tilt linkage 230, a tilt angle change to carriage sleeve 50 so that the cartridge inclination matches that of tape drive 60.

Lift assembly 20 includes carriage sleeve 50, picker mechanism 400 and a supporting structure that moves vertically within elevator tube 25 to position cartridges 40 at the desired height. Vertical movement of lift assembly 20 is driven by elevator lift motor 280. Lift assembly 20 further includes bar code reader 240 which is capable of reading bar code label information contained on the front face of the tape cartridges 40. Bar code reader 240 is primarily used to locate the position of the tape cartridge 40 to be inserted or removed. Bar code reader 240 can also be used, for example to generate an inventory of tape cartridges 40 located within automated storage library 31.

Figure 3:
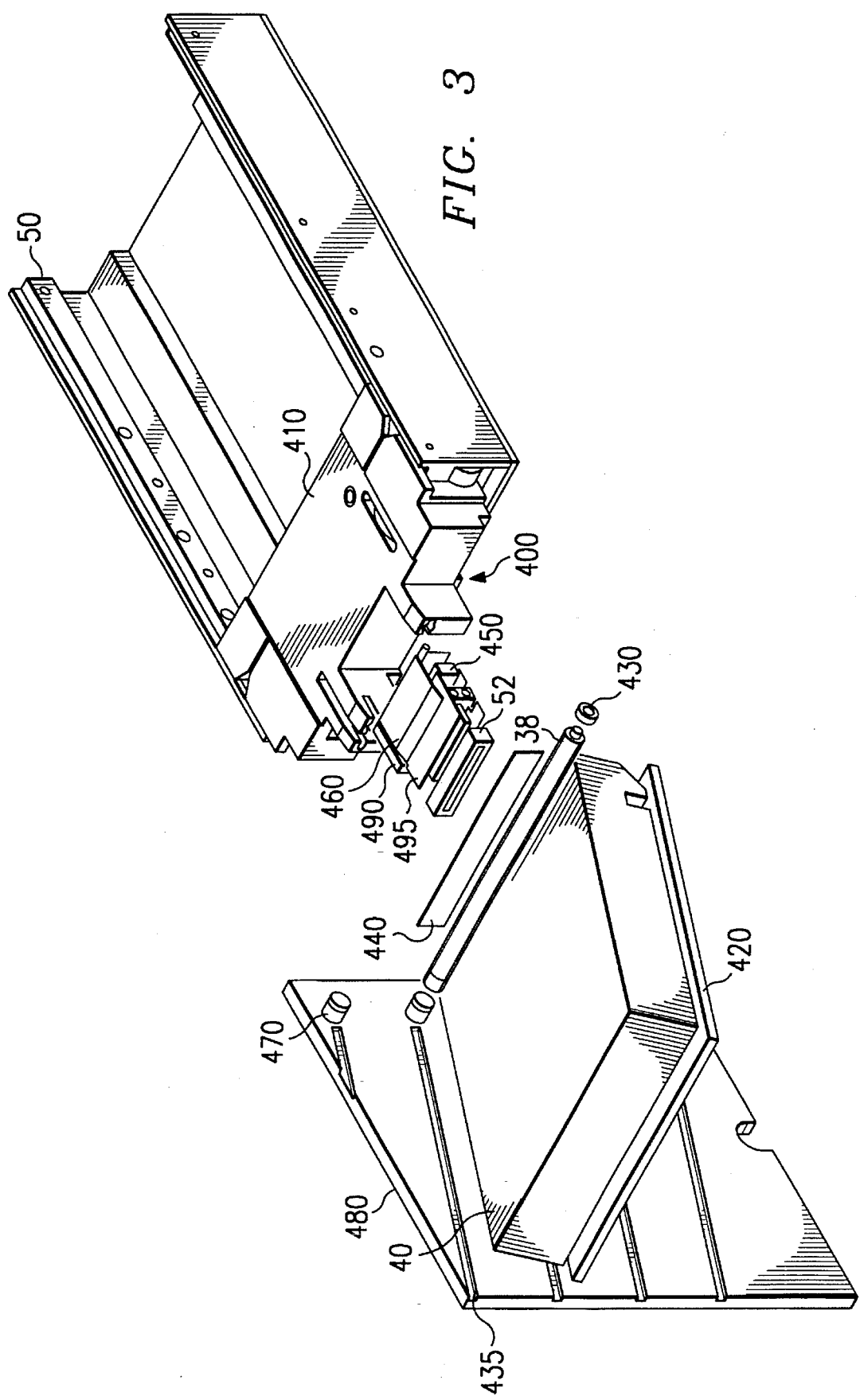
FIG. 3 is a detailed view of the picker assembly included and shown in the automated tape library of FIG. 1.
Figure 4:
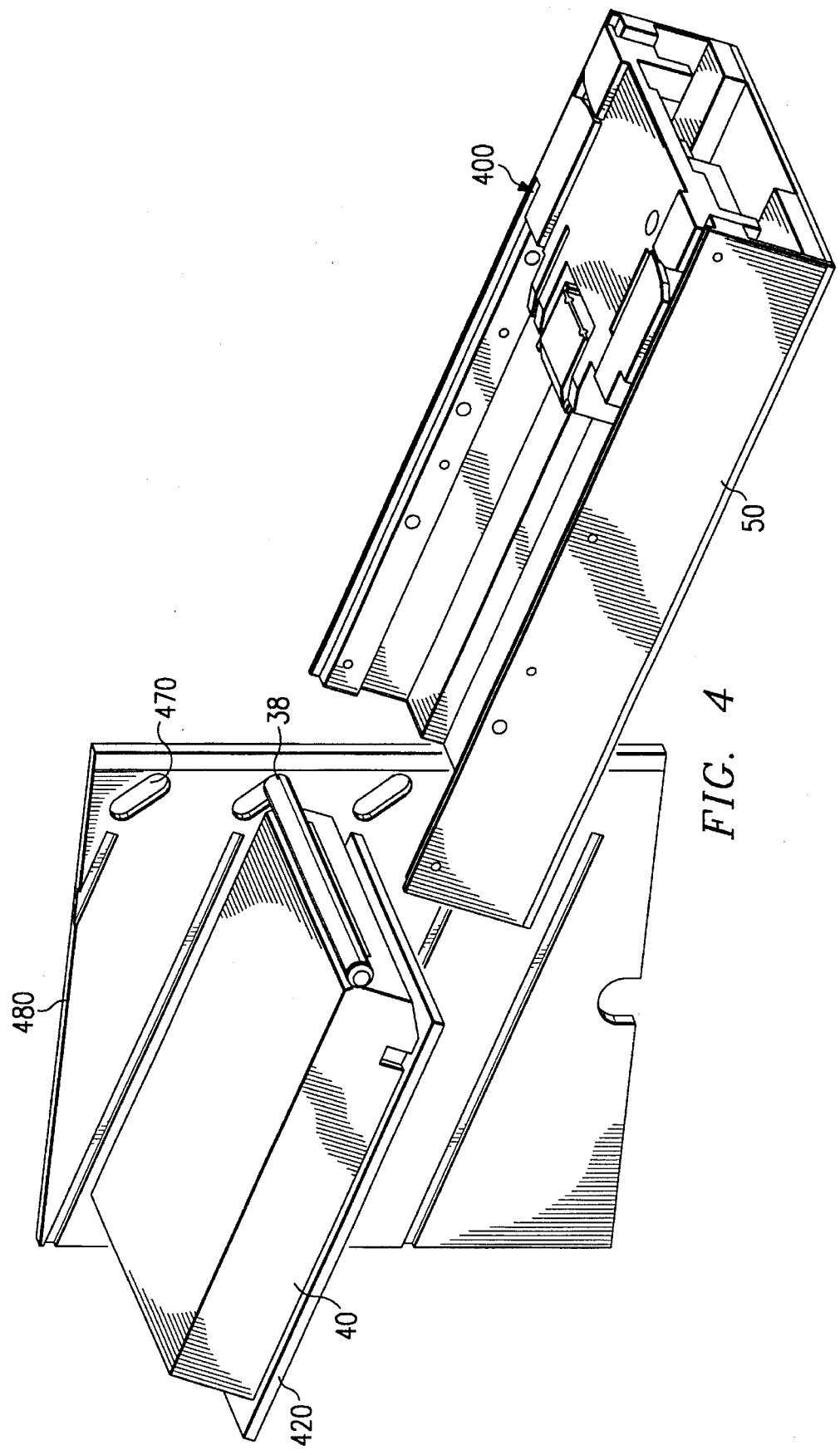
FIG. 4 is a cutaway view of a series of storage compartments and the carriage sleeve showing their relative positions in the first step of the cartridge retrieval process.
Figure 5:
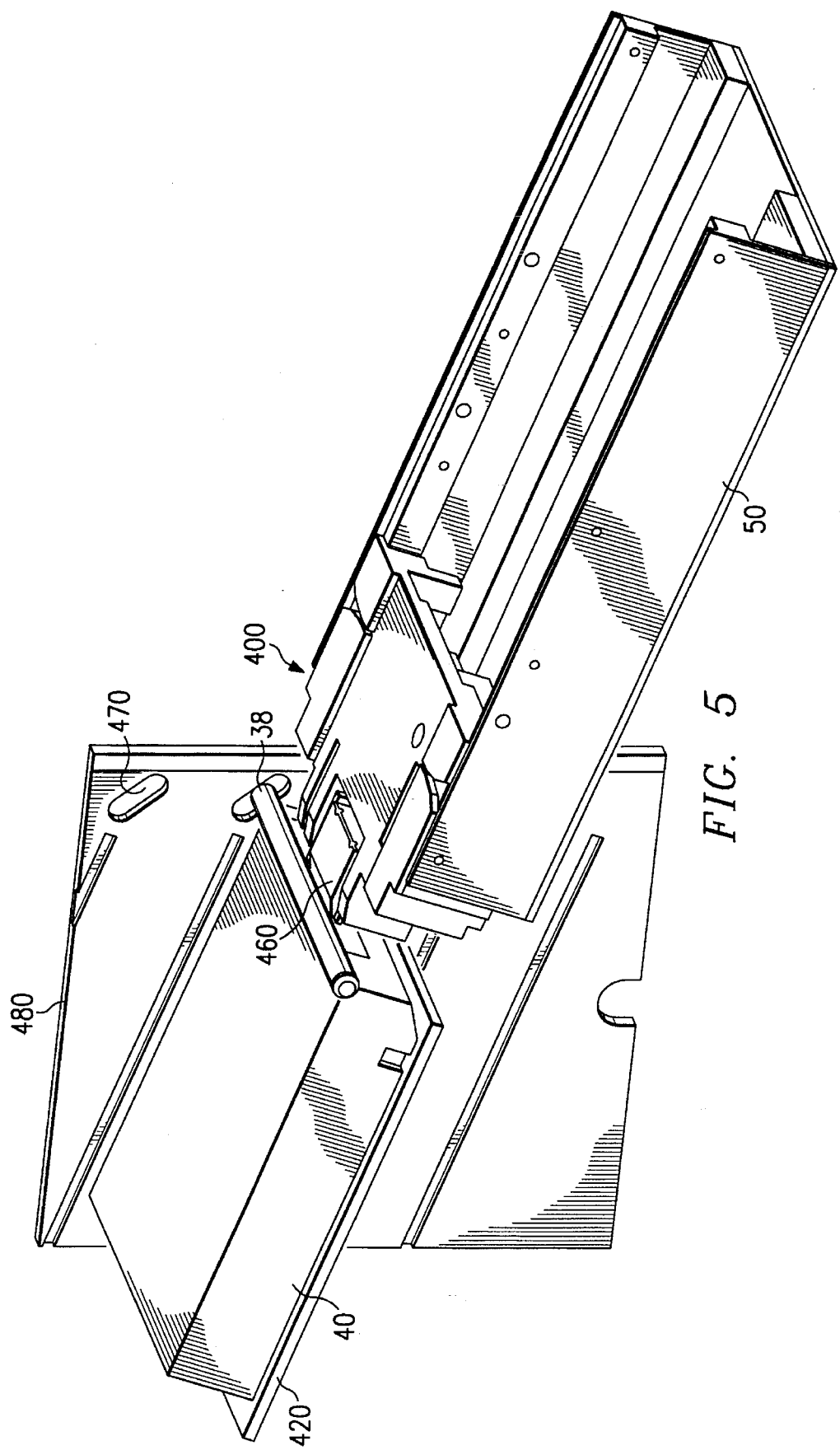
FIG. 5 is a cutaway view of a series of storage compartments and the carriage sleeve showing their relative positions in the second step of the cartridge retrieval process.
Figure 6:
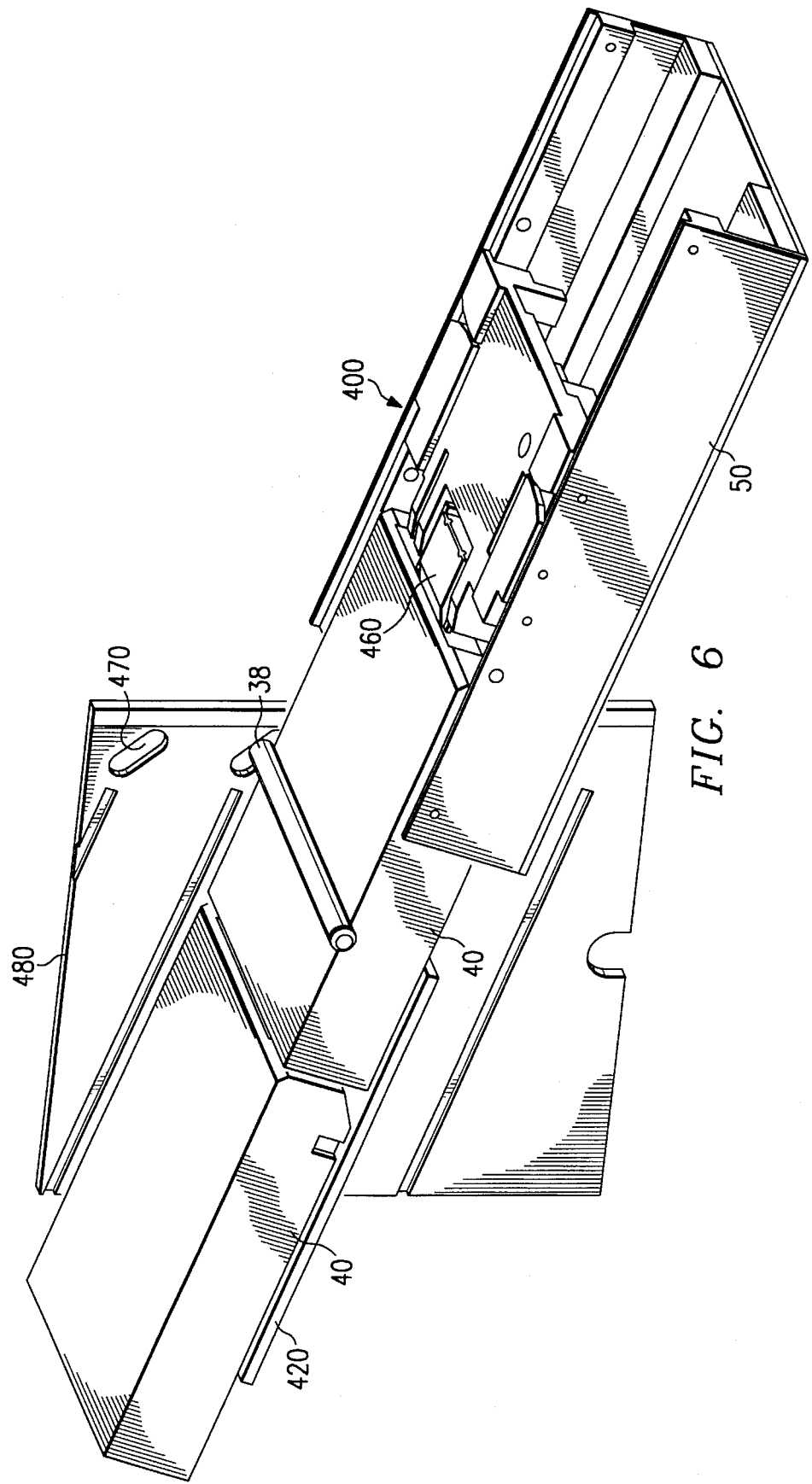
FIG. 6 is a cutaway view of a series of storage compartments and the carriage sleeve showing their relative positions in the third step of the cartridge retrieval process.

Referring now to FIG. 3, the picker assembly of the current invention is now shown and described in detail. Carriage sleeve 50 includes a gear rack to allow the picker mechanism 400 to slide back and forth within the carriage sleeve 50 as a tape is being placed in or removed from a storage compartment 32. The picker mechanism 400 consists primarily of a coil carriage 410, two electromagnetic coils (front picker 52 and rear flipper 450), a roller gate flipper 460 and a flipper pivot block 490. The coil carriage 410 houses a suitable motor for driving the picker mechanism 400 in both directions along the gear rack of the carriage sleeve 50. Any motor meeting the physical constraints imposed by carriage sleeve 50 will be acceptable for use herein.

The two electromagnetic coils serve two very important functions in the operation of this invention. Both coils 52 and 450 are connected to a single voltage source which is automatically controlled in relation to carriage sleeve 50 movements and tape requests. The coils 52 and 450 are positioned back to back within coil yoke 495. The front picker coil 52 and the rear flipper coil 450 share the same magnetic circuit and are energized simultaneously during the cartridge removal process. The magnetic field generated by front picker coil 52 attracts an adhesive backed steel strip 440 which is attached to tape cartridge 40.

The steel strip 440 can be any magnetically attracted metal which is capable of affixation to each of the tape cartridges 40 contained in the library. A suitable steel strip for use with the invention herein is typically a zinc coated low carbon steel. The steel strip 440 is then covered by a thin bar code label.

It should be noted that the magnetic force used herein is in addition to the force of gravity which may alone be sufficient to retrieve tape cartridges 40 from the storage compartments 32. This first function of the magnetic picker mechanism 400 provides assurance that the cartridges 40 will be cleanly and securely retrieved from the storage compartments 32. It is especially important to provide this first function of the magnetic picker mechanism 400 when smaller incline angles are used for the storage compartments 32.

The magnetic picker mechanism 400 further includes a second electromagnetic coil referred to herein as the rear flipper coil 450. This coil faces rearward towards coil carriage 410 and directs its magnetic field in the opposite direction from that of front picker coil 52. When rear flipper coil 450 is energized, it attracts a portion of roller gate flipper 460. Roller gate flipper is thus constructed of a magnetically attractable metal. The roller gate flipper 460, as is evident in FIG. 3, is L-shaped and may have its position adjusted about a small bar that supports the roller gate flipper 460 at its joint.

When rear flipper coil 450 is energized, it causes the vertical portion of roller gate flipper 460 to move in a generally forward direction (towards tape cartridge 40). This, in turn, causes the perpendicular horizontal portion of roller gate flipper 460 to pivot in a relatively upwards direction. If the carriage sleeve 50 and the picker mechanism 400 are in position to retrieve a tape cartridge 40, then the horizontal portion of roller gate flipper 450 will be located underneath, but in contact with, roller gate 38. The generally upward movement of roller gate flipper 460 will cause roller gate 38 to move both upwards and in the direction toward the rear of tape cartridge 40. The roller gate flipper 460 will also rotate slightly during this movement.

It can be seen in FIG. 3 that roller gate 38 is guided by roller gate slot 470. FIG. 3 shows only one cartridge library side 480 although it will be understood that for each roller gate slot 470 in the pictured cartridge library side 480, there is a corresponding roller gate slot 470 in an opposing cartridge library side 480. Roller gate slots are preferably cut out of cartridge library sides 480 and are oblong shaped grooves at an angle of inclination of 45 degrees. Roller gate slots 470 provide guiding as well as a bearing like housing for roller gate 38. The angular inclination of roller gate slots 470 is substantially higher than that of the gravity shelves 420 so as to give roller gate 38 an optimum vertical lift and to clear the way for cartridge insertion and removal.

It is also important for reliable and consistent operation to include roller gate bushings 430. Roller gate bushings 430 are attached at both ends of roller gate 38 to facilitate smooth motion of the roller gate through roller gate slots 470 which are much larger than roller gate bushings 430. Whereas roller gate slots 470 are generally oval in shape, roller gate bushings 430 are doughnut shaped and fit around the end of roller gate 38. Roller gate bushings 430 are preferably constructed from a "VESPEL" or "DELRIN" material. (Trademarks of the Dupont Corporation) This type of material provides a low friction surface so that the relatively low-weight roller gate 38 can return to its lower position after a tape has been inserted or removed.

In the preferred embodiment of this invention, the roller gate itself is constructed of nickel plated aluminum in order to reduce the coefficient of friction between the rotating roller gate 38 and the top surface of the tape cartridge 40. It will be recognized that as the tape cartridge 40 is inserted or released from compartment 32, the top surface of the tape cartridge 40 will contact roller gate 38 causing roller gate 38 to rotate. This has the advantage of reducing the frictional contact between roller gate 38 and tape cartridge 40.

It has been mentioned above that the automated storage library 31 of this invention is capable of holding more than one tape cartridge 40 in each storage compartment 32. Thus, it should be noted that when a cartridge 40 is released from a storage compartment 32 there may be one or more cartridges 40 residing behind it. If this is the case then it should be noted that roller gate 38 will fall immediately after the back end of the first cartridge 40 is released from storage compartment 32. In order to achieve this result, a tape cartridge shape providing a clearance between the back end of a first cartridge and the front end of a second cartridge should be selected. One example of such a cartridge providing the desired clearance is the IBM 3490 tape cartridge and those compatible with it. This will allow the roller gate to drop after the first cartridge passes through.

As a result of this operation, all cartridges 40 residing behind the released cartridge 40 will, under the force of gravity, be moved up to the front position within the storage compartment 32. The roller gate 38 will prevent any of these cartridges from being released.

When a cartridge 40 is being inserted into storage compartment 32, if the storage compartment 32 currently contains one or more cartridges 40, they will be pushed backwards into the storage compartment 32, by the force of the picker mechanism 400 moving forward and driving the cartridge 40 to be inserted. Once the cartridge is inserted, roller gate 38 will drop, holding all cartridges 40 in storage compartment 32.

The general insertion and removal procedures for a tape cartridge 40 with the magnetic picker of this invention is now described with reference to FIGS. 4–7. When a tape mount command is received from the host system, carriage sleeve 50 is first moved to the horizontal and vertical position corresponding to the cartridge 40 requested. Typically, magnetic picker mechanism 400 is located towards the back (and away from cartridge 40) of carriage sleeve 50 at the beginning of the cartridge retrieval process (see FIG. 4).

At this point magnetic picker mechanism 400 is repositioned within carriage sleeve 50 in close proximity to cartridge 40. Roller gate flipper 460 is located under roller gate 38 in this position (see FIG. 5). Both rear flipper coil 450 and front picker coil 52 are then simultaneously energized. This causes roller gate flipper 460 to raise roller gate 38. When roller gate flipper 460 raises roller gate 38, tape cartridge 40 located in storage compartment 32 is ready to fall out and be received by carriage sleeve 50 with the assistance of picker mechanism 400. Front picker coil 52, in its energized state, attracts steel strip 440 which is attached to tape cartridge 40. The picker mechanism 400 is then moved backwards in carriage sleeve 50 taking tape cartridge 40 with it (see FIG. 6). It should be noted that it is also possible, in the above scheme, to energize front picker coil 52 a short time after rear flipper coil 450 with the same results.

Figure 7:
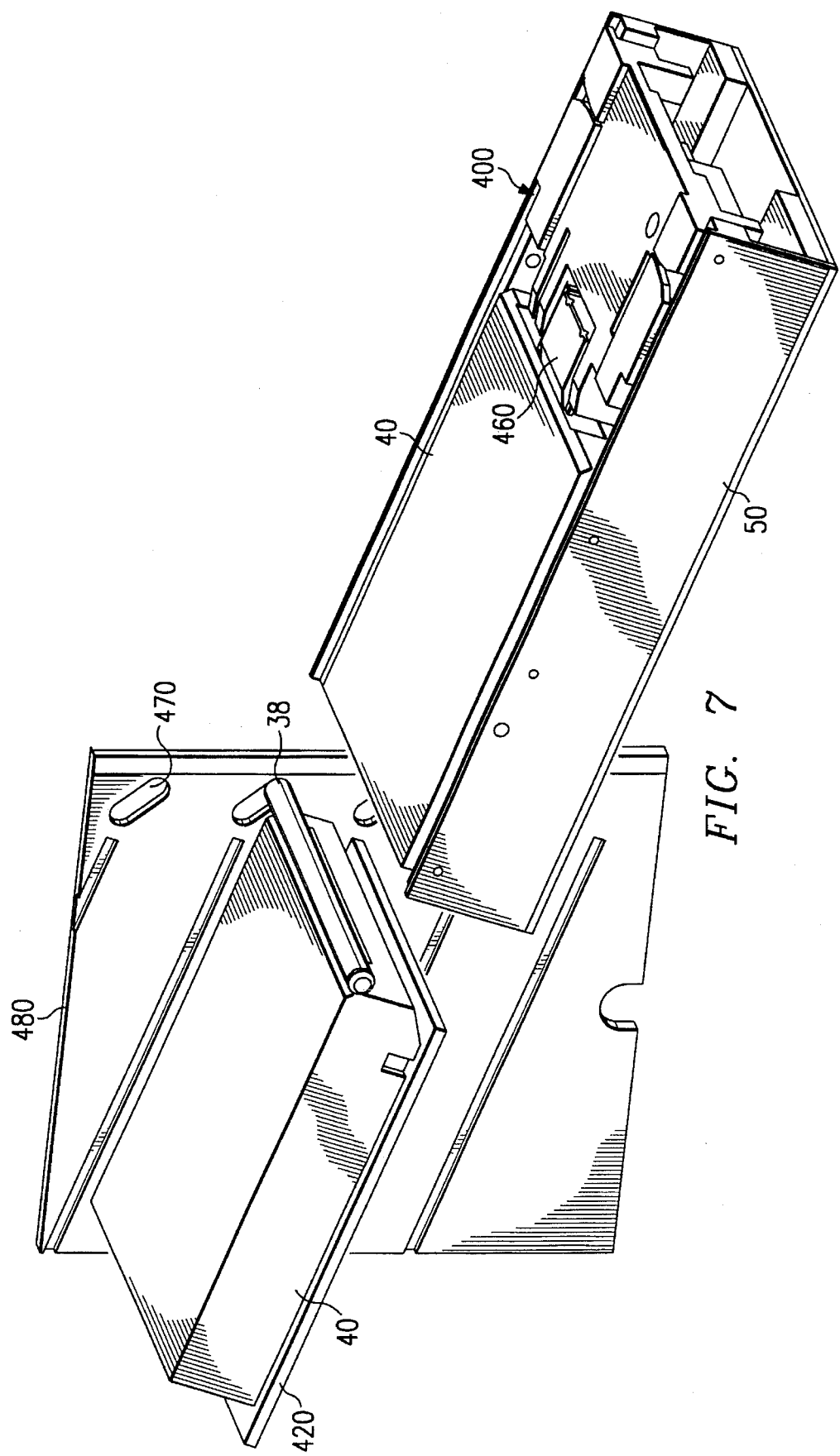
FIG. 7 is a cutaway view of a series of storage compartments and the carriage sleeve showing their relative positions in the final step of the cartridge retrieval process.

Tape cartridge 40 is repositioned, by the forces of both gravity and the movement of picker mechanism 400, until it is fully contained within carriage sleeve 50 (see FIG. 7). At this point, carriage sleeve 50, now holding tape cartridge 40 is moved by elevator mechanism 20 to the tape loading area for one of tape drives 60. Picker mechanism 400 is driven forward towards the tape loading area thereby inserting tape cartridge 40 into tape drive 60.

The cartridge insertion process is very similar to the cartridge removal process. In this case, the roller gate 38 can be opened by the pushing action of tape cartridge 40. The roller gate 38 will move up on the 45 degree incline of roller gate slot 470 and slide/roll against the top surface of tape cartridge 40 until the entire cartridge 40 clears the roller gate 38 and enters storage compartment 32. The roller gate 38 will then drop and provide positive retention of the cartridge 40 in the storage compartment 32.

While the invention has been shown and described with reference to a preferred embodiment, it will be understood by those skilled in the art that various changes in form and details may be made therein without departing from the spirit and scope of the invention.

What is claimed is:

1. A cartridge storage apparatus for storing computer data storage elements comprising:

one or more drive units capable of reading data from said data storage elements; and a plurality of storage compartments for holding said data storage elements, each one of said storage compartments further comprising a low friction sliding plane having a rear end and a forward end, first and second cartridge library sides and a roller gate disposed above said sliding plane and in close proximity to said forward end of said sliding plane, said roller gate retaining one of said data storage elements in one of said storage compartments, said roller gate movably positioned at a first end within a roller gate slot integrally formed within said first cartridge library side and at a second end within a roller gate slot integrally formed within said second cartridge library side, said roller gate slots permitting said roller gate to be raised from a first position retaining one of said data storage elements in one of said storage compartments to a second position not retaining said one of said data storage elements in said one of said storage compartments, said roller gate slots also permitting said roller gate to be lowered from the second position to the first position solely under the force of gravity.

2. The cartridge storage apparatus of claim 1 wherein said storage compartments are of a size suitable for holding a plurality of data storage elements.

3. The cartridge storage apparatus of claim 1 wherein said data storage elements are tape cartridges.

4. The cartridge storage apparatus of claim 1 wherein said data storage elements are optical disk cartridges.

5. The cartridge storage apparatus of claim 1 wherein said roller gates further include at each of its first and second ends a roller gate bushing.

6. The cartridge storage apparatus of claim 1 wherein said roller gate slots are formed at an angular inclination more vertical than that of said sliding planes.

7. The cartridge storage apparatus of claim 1 wherein said roller gate resides in a horizontal plane and said low friction sliding planes are positioned at an angle of 18 degrees from the horizontal plane and said roller gate slots are formed at an angle of 45 degrees from the horizontal plane.

8. A magnetic picker apparatus for storing and retrieving data storage elements to and from a cartridge storage apparatus, said data storage elements being maintained within said cartridge storage apparatus by a roller gate on said cartridge storage apparatus, said data storage elements having a magnetically attractable portion, said magnetic picker apparatus comprising:

a coil carriage;

first and second electromagnetic coils mounted on said coil carriage; means for energizing said first and second electromagnetic coils;

means, responsive to said first electromagnetic coil being energized, for raising said roller gate to release said data storage element from said cartridge storage apparatus, said means for raising said roller gate including an L-shaped roller gate flipper having a magnetically attractable vertical and a horizontal leg and being mounted such that said vertical leg is positioned adjacent to said first electromagnetic coil, said second electromagnetic coil is positioned to attract one of said data storage elements and said first electromagnetic coil is positioned to attract said vertical leg of said L-shaped roller gate flipper; and said second electromagnetic coil, upon being energized, for magnetically attracting one of said data storage elements for the purpose of withdrawing said data storage element from said cartridge storage apparatus.

9. The magnetic picker apparatus of claim 8 wherein said data storage elements are tape cartridges.

10. The magnetic picker apparatus of claim 8 wherein said data storage elements are optical disk cartridge.

11. The magnetic picker apparatus of claim 8 further including and being mounted within a carriage sleeve having a gear rack for temporarily holding a data storage element, said coil carriage being motor driven throughout the length of said carriage sleeve.

12. The magnetic picker apparatus of claim 8 wherein said first and second electromagnetic coils are mounted on a coil yoke so as to project first and second magnetic fields in opposing directions.

13. A method for unloading a data storage element from a storage compartment having a low friction sliding plane, first and second cartridge library sides and a roller gate disposed above said sliding plane on said storage compartment, said roller gate retaining said data storage element in said storage compartment, said data storage element having a magnetically attractable portion, the method including the steps of:

providing a carriage sleeve for holding and transporting a data storage element;

providing a picker assembly having first and second electromagnetic coils and a roller gate flipper activated by said second electromagnetic coil;

moving said picker assembly forward in said carriage sleeve and toward said data storage element;

energizing said first electromagnetic coil to magnetically attract said data storage element;

energizing said second electromagnetic coil to activate said roller gate flipper to raise said roller gate and release said data storage element to permit removal of said data storage element; and upon removal of said data storage element, deenergizing said second electromagnetic coil to lower said roller gate from a raised second position to a lowered first position solely under the force of gravity.

14. The method of claim 13 wherein said storage compartment is of a size suitable for holding a plurality of data storage elements and when said storage compartment holds more than one data storage element, said data storage elements that are not at a front of said storage compartment slide downward towards the front of said storage compartment upon the removal of said data storage element that is at the front of said storage compartment.

15. The method of claim 13 further including the step of moving said picker assembly rearward to draw said data storage element into said carriage sleeve.

16. The method of claim 13 wherein said first and second electromagnetic coils are energized simultaneously.

17. An automated storage library for storing and retrieving computer data storage elements comprising:

one or more drive units capable of reading data from said data storage elements;

a plurality of storage compartments for holding said data storage elements;

each one of said storage compartments further comprising a low friction sliding plane having a rear end and a forward end and a roller gate disposed above said sliding plane and in close proximity to said forward end of said sliding plane, said roller gate retaining one of said data storage elements in one of said storage compartments; and a picker mechanism, said picker mechanism further including a coil carriage, a roller gate flipper having a magnetically attractable portion, and a first electromagnetic coil and an energy source for energizing said first electromagnetic coil, energization of the first electromagnetic coil causing the roller gate flipper to raise the roller gate from a first position retaining one of said data storage elements in one of said storage compartments to a second position not retaining said one of said data storage elements in said one of said storage compartments, subsequent de-energization of the first electromagnetic coil causing said roller gate to lower from the second position to the first position solely under the force of gravity.

18. The automated storage library of claim 17 wherein said picker mechanism further includes a second electromagnetic coil and an energy source for energizing said second electromagnetic coil, energization of the second electromagnetic coil magnetically attracting said one of said data storage elements via a magnetically attractable portion thereof.

19. An automated storage library for storing and retrieving computer data storage elements, said data storage elements having a magnetically attractable portion, the automated storage library comprising:

one or more drive units capable of reading data from said data storage elements;

a plurality of storage compartments for holding said data storage elements;

each one of said storage compartments further comprising a low friction sliding plane having a rear end and a forward end and a roller gate disposed above said sliding plane and in close proximity to said forward end of said sliding plane, said roller gate retaining one of said data storage elements in one of said storage compartments; and a picker mechanism, said picker mechanism further including a coil carriage, an L-shaped roller gate flipper and first and second electromagnetic coils and an energy source for energizing said first and second electromagnetic coils, said L-shaped roller gate flipper having a magnetically attractable vertical and a horizontal leg and being mounted such that said vertical leg is positioned adjacent to said first electromagnetic coil, said second electromagnetic coil is positioned to attract one of said data storage elements and said first electromagnetic coil is positioned to attract said vertical leg of said L-shaped roller gate flipper, energization of the first electromagnetic coil causing the roller gate flipper to raise the roller gate from a first position retaining one of said data storage elements in one of said storage compartments to a second position not retaining said one of said data storage elements in said one of said storage compartments.

20. A method for unloading a data storage element from a storage compartment having a low friction sliding plane, first and second cartridge library sides and a roller gate disposed above said sliding plane on said storage compartment, said roller gate retaining said data storage element in said storage compartment, said data storage element having a magnetically attractable portion, the method including the steps of:

providing a carriage sleeve for holding and transporting a data storage element;

providing a picker assembly having first and second electromagnetic coils and an L-shaped roller gate flipper, said L-shaped roller gate flipper having a magnetically attractable vertical and horizontal leg and being mounted such that said vertical leg is positioned adjacent to said second electromagnetic coil, said first electromagnetic coil is positioned to attract said data storage element and said second electromagnetic coil is positioned to attract said vertical leg of said L-shaped roller gate flipper;

moving said picker assembly forward in said carriage sleeve and toward said data storage element;

energizing said first electromagnetic coil to magnetically attract said data storage element; and energizing said second electromagnetic coil to activate said roller gate flipper to raise said roller gate and release said data storage element.

\* \* \* \* \*